No. 876,732. PATENTED JAN. 14, 1908.
H. A. SCHMIDT.
AUTOMATIC FISHING TACKLE.
APPLICATION FILED MAY 1, 1907.
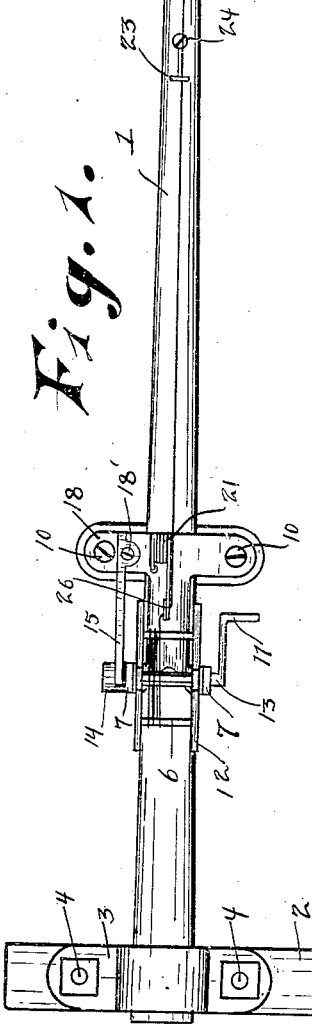
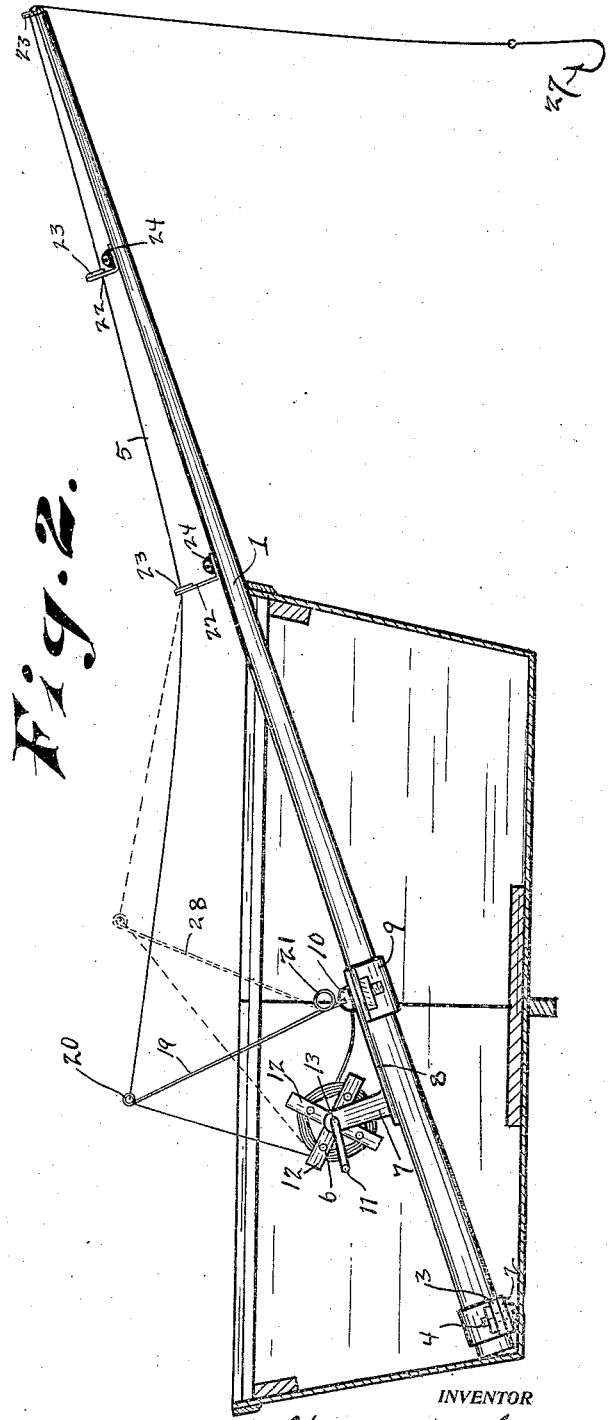
WITNESSES:
INVENTOR
ATTORNEYS.
THE NORRIS PETERS CO., WASHINGTON, D. C.

UNITED STATES PATENT OFFICE.

HENRY A. SCHMIDT, OF MILWAUKEE, WISCONSIN.

AUTOMATIC FISHING-TACKLE.

No. 876,732.   Specification of Letters Patent.   Patented Jan. 14, 1908.

Application filed May 1, 1907. Serial No. 371,322.

*To all whom it may concern:*

Be it known that I, HENRY A. SCHMIDT, a citizen of the United States, residing at Milwaukee, county of Milwaukee, and State of Wisconsin, have invented new and useful Improvements in Automatic Fishing-Tackles, of which the following is a specification.

My invention relates to improvements in fishing tackles and it pertains to that class which is adapted to be used in connection with a boat for trolling.

It is a well known fact that when a fish line is rigidly affixed to a rigid pole, it is liable to be broken by a sharp quick pull of a fish.

The object of my invention is to provide a device by which the line may be yieldingly attached to a pole so that it will be free to move forwardly slightly with the fish when first grasped; also by which when the line is slackened by the reverse movement of the fish it will be drawn in slightly to prevent the hook from becoming disengaged or released.

The construction of my invention is explained by reference to the accompanying drawings in which, Figure 1 is a top view thereof, and Fig. 2 is a side view as the same appears supported from the bottom and side of a boat.

Like parts are identified by the same reference figures in both views.

1 represents the pole which is adapted to be used in connection with a boat for trolling purposes. The pole 1 is provided at its lower end with a transversely arranged bar 2. The bar 2 is secured to the pole by a semi-circular clamping plate 3 and fastening bolts 4, 4. The object of the bar 2 is to prevent the pole from turning over when supported from the side of a boat, whereby the line supporting mechanism will be retained in the vertical position, as indicated in Fig. 2. 5 represents the line and 6 the line supporting reel. The reel 6 is revolubly connected with the pole 1 by the standards 7, longitudinal plate 8, clamping plate 9 and clamping bolts 10. The reel 6 is provided with a crank 11 of ordinary construction by which the line is wound thereon. The reel 6 comprises the transversely arranged bars 12 which are centrally supported from the shaft 13, which shaft is in turn supported upon the standard 7 and adapted to be revolved by the crank 11. It will be obvious that by this construction the air is free to circulate beneath and around the fish line and to readily dry the same when wet. To prevent the reel from running too freely and the line being accidentally unwound therefrom, I provide one end of the shaft 13 with a friction bearing roller 14 upon the periphery of which a resilient brake bearing 15 is adapted to yieldingly rest. The brake bearing 15 is preferably made of resilient metal and is rigidly connected at one end to the arm 18 by the screw 18', the arm 18 being formed integrally with the plate 8 which is secured to the pole by the bolts 10 as previously described. The tension of the brake bearing 15 is such that it will permit the reel to revolve freely as the line is being drawn out by a fish or wound upon the reel by the operator while it bears with sufficient force to prevent the reel from being accidentally revolved in either direction. 19 is a resilient vibratory arm which is rigidly affixed at its lower end to the plate 8 and is provided at its upper end with a loop or coil 20 through which the line 5 is drawn. To increase the resiliency of the arm 19 when made as shown of a resilient wire, I preferably provide the same at its lower end with a spiral coil 21.

22 is a series of resilient line supporting arms which are provided with loops or apertures 23 for the reception of the line 5. The arms 22 are respectively connected with the pole 1 by fastening screws 24 or in any convenient manner. It will be obvious that the line may be freely drawn in either direction through its supporting bearings and thus adjusted at the desired length for fishing. When the line has been thus adjusted it is readily affixed to the loop 20 at the desired point of adjustment by engaging the same between the coils 26 of the loop 20. When the line has been thus secured between the coils 26 of the loop, such coil will prevent the line from being further unwound from the reel. The line having been adjusted at the desired length as shown in Fig. 2 and having been secured to the loop 20 between the coils 26 it will be obvious that when a pull is given to the hook 27 the arm 19 will be drawn forwardly from the position shown in Fig. 2 to that indicated in dotted lines 28; that as soon as the line is slackened by the reverse movement of the fish it will be drawn back in the position indicated in Fig. 2 by the resilient action of said arm and that the arm 19 will be thus caused to vibrate forwardly and backwardly as it is drawn upon and released by the movement of the fish, whereby the line is prevented from being broken by a sudden pull and whereby the slack will be taken up by a reverse movement of the fish and the hook prevented from becoming disengaged from the fish.

Having thus described my invention what I claim as new and desire to secure by Letters Patent is,

1. In a device of the described class the combination of a fish pole, a revoluble reel, a vibratory line supporting arm, and a plurality of stationary line supporting arms affixed at one end to one side of said pole and a fish line supported at one end from said reel and at its free end from said vibratory and stationary arms.

2. In a device of the described class the combination of a fish pole, a revoluble reel, a friction roller bearing connected with one end of the reel, a yielding brake bearing rigidly connected at one end with the pole and adapted to bear at its free end upon the periphery of said roller bearing, a vibratory line supporting arm, and a plurality of stationary line supporting arms, affixed at one end to one side of said pole and a fish line supported at one end from said reel and at its free end from said vibratory and stationary arms.

3. In a device of the described class the combination of a fish pole, a revoluble reel, a vibratory line supporting arm provided at its free end with a line retaining loop and means for securing the fish line to said loop, and a plurality of stationary line supporting arms affixed at one end to one side of said pole and a fish line supported at one end from said reel and at its free end from said vibratory and stationary arms.

4. In a device of the described class the combination of a fish pole, a transverse bar affixed to one end of said pole and adapted to prevent the same from rolling upon its support, a revoluble reel, a vibratory line supporting arm and a plurality of stationary line supporting arms, affixed at one end to one side of said pole and a fish line supported at one end from said reel and at its free end from said vibratory and stationary arms.

5. In a device of the described class the combination of a fish pole, a transverse bar affixed to one end of said pole adapted to prevent the same from rolling upon its support, a revoluble reel, a supporting shaft therefor a roller bearing attached to one end of the reel supporting shaft, a yielding bearing rigidly connected at one end with said pole and adapted to bear at its opposite end upon said a roller bearing, a vibratory arm and a plurality of stationary line supporting arms affixed at one end to one side of said pole, a fish line supported at one end from said reel and at its opposite end in said vibratory arm, and means for temporarily securing said line to the free end of said vibratory arm, all substantially as and for the purpose specified.

In testimony whereof I affix my signature in the presence of two witnesses.

HENRY A. SCHMIDT.

Witnesses:
JAS. B. ERWIN,
M. M. SCHULZ.